US011129041B2

(12) United States Patent
Chen et al.

(10) Patent No.: US 11,129,041 B2
(45) Date of Patent: Sep. 21, 2021

(54) REPORTING EARLY MEASUREMENT RESULTS IN THE NEXT GENERATION WIRELESS NETWORKS

(71) Applicant: FG Innovation Company Limited, Tuen Mun (CN)

(72) Inventors: Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/515,465

(22) Filed: Jul. 18, 2019

(65) Prior Publication Data

US 2020/0029239 A1 Jan. 23, 2020

Related U.S. Application Data

(60) Provisional application No. 62/701,016, filed on Jul. 20, 2018.

(51) Int. Cl.
| | |
|---|---|
| *H04W 76/27* | (2018.01) |
| *H04W 24/10* | (2009.01) |
| *H04W 52/02* | (2009.01) |
| *H04W 76/15* | (2018.01) |
| *H04W 76/30* | (2018.01) |
| *H04W 76/11* | (2018.01) |

(Continued)

(52) U.S. Cl.
CPC ....... *H04W 24/10* (2013.01); *H04W 52/0229* (2013.01); *H04W 72/046* (2013.01); *H04W 76/11* (2018.02); *H04W 76/15* (2018.02); *H04W 76/19* (2018.02); *H04W 76/27* (2018.02); *H04W 76/30* (2018.02)

(58) Field of Classification Search
CPC ............. H04W 24/10; H04W 52/0229; H04W 72/046; H04W 76/11; H04W 76/15; H04W 76/19; H04W 76/27; H04W 76/30; H04W 36/0055; H04W 36/0085; H04W 72/0453; H04W 72/085; H04W 74/0833
See application file for complete search history.

(56) References Cited

U.S. PATENT DOCUMENTS

| | | | |
|---|---|---|---|
| 10,531,326 B2 * | 1/2020 | Hong | ............ H04W 24/10 |
| 2008/0014957 A1 * | 1/2008 | Ore | ............ H04W 36/0088 455/452.1 |

(Continued)

FOREIGN PATENT DOCUMENTS

| | | |
|---|---|---|
| CN | 1867163 A | 11/2006 |
| CN | 104186011 A | 12/2014 |

(Continued)

*Primary Examiner* — Phuc H Tran
(74) *Attorney, Agent, or Firm* — ScienBiziP, P.C.

(57) ABSTRACT

Some of the present implementations provide a method for reporting measurement results by a user equipment (UE). The method receives, at the UE, a radio resource control (RRC) release message to transition to an RRC Inactive state. The method of some of the present implementations performs measurements while in the RRC Inactive state. The method then receives an RRC resume message from a base station, the RRC resume message comprising a request for the measurement results. After receiving the RRC resume message, the method transmits the measurement results to the base station in an RRC resume complete message.

18 Claims, 8 Drawing Sheets

(51) Int. Cl.
   *H04W 72/04*   (2009.01)
   *H04W 76/19*   (2018.01)

(56) References Cited

U.S. PATENT DOCUMENTS

| | | | |
|---|---|---|---|
| 2015/0281990 A1* | 10/2015 | Kelley | H04W 24/10 |
| | | | 370/241 |
| 2018/0054795 A1* | 2/2018 | Edge | H04W 4/02 |
| 2018/0192426 A1* | 7/2018 | Ryoo | H04W 74/0833 |
| 2018/0206248 A1* | 7/2018 | Zhang | H04W 72/085 |
| 2018/0220486 A1* | 8/2018 | Tseng | H04W 36/305 |
| 2019/0037425 A1* | 1/2019 | Hong | H04W 72/042 |
| 2020/0187245 A1* | 6/2020 | Fujishiro | H04W 74/002 |
| 2020/0205216 A1* | 6/2020 | Tseng | H04W 36/305 |
| 2020/0221418 A1* | 7/2020 | Kim | H04W 76/10 |
| 2020/0229111 A1* | 7/2020 | Kim | H04W 74/006 |

FOREIGN PATENT DOCUMENTS

| | | |
|---|---|---|
| WO | 2014146725 A1 | 9/2014 |
| WO | 2018128469 A1 | 7/2018 |

\* cited by examiner

REPORTING EARLY MEASUREMENT RESULTS IN THE NEXT GENERATION WIRELESS NETWORKS

CROSS-REFERENCE TO RELATED APPLICATION(S)

The present application claims the benefit of and priority to a provisional U.S. Patent Application Ser. No. 62/701,016, filed on Jul. 20, 2018, entitled "Reducing Setting Up Delay for DC and CA," (hereinafter referred to as "US74539 application"). The disclosure of the US74539 application is hereby incorporated fully by reference into the present application.

FIELD

The present disclosure generally relates to wireless communications, and more particularly, to reporting early measurement results in the next generation wireless networks.

BACKGROUND

In new radio (NR), a user equipment (UE) may transition to a radio resource control (RRC) Inactive state frequently (e.g., for power saving). When a UE receives a radio resource control (RRC) Release message with a suspend configuration from the network (NW), the UE transitions to the RRC Inactive state. When an uplink (UL) and/or downlink (DL) transmission is required, however, the UE may resume the connection (e.g., to a serving cell) by triggering an RRC Connection Resume procedure. After the UE transitions back to an RRC Connected state, the NW (e.g., the serving cell) may send measurement configurations to the UE to start new measurements (e.g., inter-frequency measurements). It may take a long time for the UE to perform the measurements and report the measurement results to the NW after the UE receives the measurement configurations. Meanwhile, the NW may require the measurement results to be able to set up a dual connectivity (DC) mode or a carrier aggregation (CA) mode for the UE (if needed). The delay in reporting the measurement results may degrade the utilization rate of the radio resources, especially on the higher frequency bands, such as millimeter wave (mmW) bands (or higher frequencies), since the UE may finish the UL/DL transmissions and return to the RRC Inactive state even before the DC mode and/or CA mode is set up for the UE to facilitate the UL/DL transmissions.

In the next generation wireless networks (e.g., NR-E-UTRA Dual Connectivity (NE-DC), Next Generation E-UTRA-NR Dual Connectivity (NGEN-DC), and NR-NR DC states, or in an NR CA state), reducing the set up time delay for entering a DC mode (or a CA mode) is beneficial for data transmission via higher frequency bands (e.g., mmW bands) when a UE transitions from the RRC Inactive state to the RRC Connected state.

SUMMARY

The present disclosure is directed to reporting early measurement results in the next generation wireless networks.

In a first aspect of the present application, a method for reporting measurement results by a user equipment (UE) is provided. The method comprises receiving, at the UE, a radio resource control (RRC) release message to transition to an RRC Inactive state; performing measurements while in the RRC Inactive state; receiving an RRC resume message from a base station, the RRC resume message comprising a request for the measurement results; and transmitting the measurement results to the base station in an RRC resume complete message.

In an implementation of the first aspect, the RRC release message received from the base station further comprises measurement configurations, wherein performing the measurements comprises performing the measurements based on the measurement configurations received in the RRC release message.

Another implementation of the first aspect further comprises receiving measurement configurations via broadcasting system information before performing the measurements, wherein performing the measurements comprises performing the measurements based on the measurement configurations.

In another implementation of the first aspect, the measurement results comprise beam-level measurement.

In another implementation of the first aspect, the beam-level measurement comprises at least identification for at least a best beam that has a strongest beam quality.

In another implementation of the first aspect, the beam-level measurement further comprises at least identification for one or more beams other than the best beam when network requires the measurement results for the one or more beams.

In another implementation of the first aspect, the base station sets up at least one of a dual connectivity (DC) mode and a carrier aggregation (CA) mode for the UE by sending a first RRC reconfiguration message to the UE after receiving the measurement results from the UE.

Another implementation of the first aspect further comprises transmitting an indicator to the base station for resuming a previous dual connectivity mode irrespective of the measurement results.

Another implementation of the first aspect further comprises, before performing the measurements in the RRC Inactive state, receiving broadcasting system information comprising an indicator associated with measurements in an RRC Inactive state.

In a second aspect of the present application, a UE is provided. The UE comprises one or more non-transitory computer-readable media having computer-executable instructions for reporting measurement results while the UE is in a radio resource control (RRC) Inactive state, and at least one processor coupled to the one or more non-transitory computer-readable media, and configured to execute the computer-executable instructions to: receive, at the UE, an RRC release message to transition to an RRC Inactive state; perform measurements while in the RRC Inactive state; receive an RRC resume message from a base station, the RRC resume message comprising a request for the measurement results; and transmit the measurement results to the base station in an RRC resume complete message.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
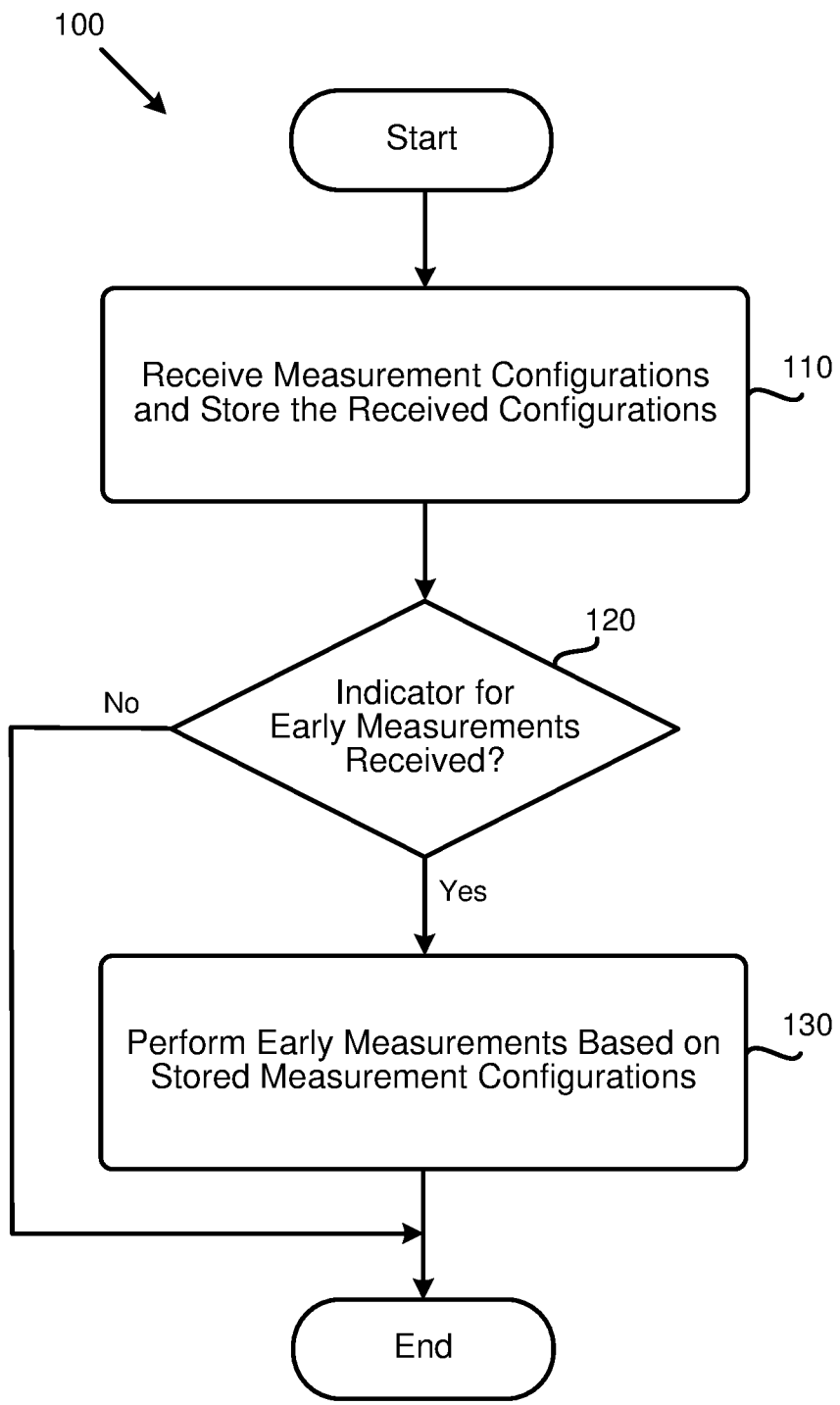
FIG. 1 is a flowchart illustrating a method (or process) performed by a UE to prepare early measurement results for a serving base station, while the UE is in an RRC Inactive state, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), a 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR, and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC (Multi-Radio Dual Connectivity) cases, the primary cell (PCell) of an MCG or a primary secondary cell of an SCG may be called a special cell (SpCell). So, a PCell may refer to the SpCell of an MCG, while a PSCell may refer to the SpCell of an SCG. An MCG may include a group of serving cells associated with the MN, comprising of the SpCell and optionally one or more secondary cells (SCells). An SCG may include a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

In some aspects of the present implementations, the NW (e.g., a base station) may provide measurement configurations (e.g., Radio Resource Management (RRM) measurement configurations) to a UE, so that the UE may perform measurement procedure(s) while the UE is in a Radio Resource Control (RRC) Inactive state. Upon resuming the connection (e.g., to the same or different base station), the UE may send the measurement reports prepared based on the measurement configurations (assuming that the reporting criteria is satisfied) to the serving base station. Thereafter, the serving base station may set up a DC mode or CA mode for the UE by sending the first RRC configuration message (after the connection is resumed) to the UE. As a result, the UE may be able to perform the UL/DL transmissions in a DC (or CA) mode after the UE is back to the RRC Connected state.

FIG. 1 is a flowchart illustrating a method (or process) 100 performed by a UE to prepare early measurement results for a serving base station, while the UE is in the RRC Inactive state, according to an example implementation of the present application. The process 100, in some of the present implementations, may start in action 110 by receiving, at a UE, measurement configurations (e.g., inactive (RRM) measurement configurations, or early measurement configurations) and storing the received measurement configurations. As described above, in order to set up a DC or CA mode for a UE faster, the UE may have to first perform early measurements, while the UE is in an inactive state, and then provide the early measurement results to the serving cell. In some of the present implementations, the UE may perform the early measurements based on early measurement configurations that the UE may have received from a serving cell, while the UE has been in a connected state.

In some aspects of the present implementations, the UE may receive the early measurement configurations (or the inactive measurement configurations) in an RRC Release message that may include suspend configuration for instructing the UE to enter into an RRC Inactive state. In some other aspects of the present implementations, the UE may receive the early measurement configurations in a certain RRC message other than the RRC Release message. In yet other aspects of the present implementations, the UE may receive the inactive (RRM) measurement configurations (or the early measurement configurations) in the broadcasting system information (and not through dedicated signaling). In some aspects of the present implementations, the UE may preform measurements based on the inactive (or early) measurement configuration if an indicator for early measurements is present or set to "TRUE" (or "1"). The inactive (or early) measurement configurations, in some of the present implementations, may include configuration for performing cell level and/or beam level measurements. For example, the inactive (RRM) measurement configurations may be set to a cell-level measurement, or a cell-level measurement together with beam-level measurement, which may include the identification and quality information about one beam (e.g., the best/strongest beam) or several different beams. For example, the inactive (RRM) measurement configurations may be set to a cell-level measurement, or a cell-level measurement together with beam-level measurement, which may include the identification about one beam (e.g., the best/strongest beam) or several different beams.

After receiving and storing the early measurement configurations, the UE may determine, in action 120, whether an indicator for early measurements is received. In some aspects of the present implementations, this indicator may be in the same RRC Release message that includes the early measurement configurations. In one aspect of the present implementations, receiving the RRC Release message that includes the early measurement configurations is, in and of itself, an indication for the UE to perform the early measurements and a separate indicator is not required. In some other aspects of the present implementations, the indicator may be received via separate broadcasting system information.

After determining that an indicator for (performing) early measurements is received (e.g., through dedicated signaling, such as an RRC Release message, or through broadcasting system information), the UE may perform, in action 130, early measurements. In some of the present implementations, the UE may perform the early measurements based on the stored inactive measurement configurations, while the UE is in the RRC Inactive state. In some of the present implementations the UE may perform early measurements upon initializing an RRC Connection Resume procedure (e.g., after sending the RA preamble), or upon a specific time (slot/symbol) before initializing the RRC Connection Resume procedure. In some aspects of the present implementations, the UE may perform early measurements based on the UE's implementation (e.g., based on the target service type or the power condition). For example, for an inactive UE that targets on supporting ultra-reliable and low-latency communications (URLLC) services, the UE may perform early measurements based on the inactive measurement configuration. As another example, a UE with low power may not perform early measurements based on the inactive measurement configuration. The process 100 may then end.

In some of the present implementations, as discussed in more detail below with reference to FIG. 2, once an RRC Connection Resume procedure is triggered, the UE may provide the available measurement results, prepared based on performing the early measurements, to a current serving cell (or base station). As a result, the current serving cell may set up the DC mode (or CA mode) for the UE faster. In some of the present implementations, the UE may send an indicator to the serving cell to indicate to the serving cell that the measurement results are available. In some of the present implementations, in addition to, or instead of, sending an indicator for availability of the measurement results, the UE may send an indicator to the serving cell to show that the UE has stayed at the same place (or within the same area), or kept stationary after entering the RRC Inactive state. In some such implementations, the serving cell may resume a previous DC (or CA) mode (instead of setting up a new DC mode) after receiving such an indicator and determining that the UE has stayed within the same area, while in the RRC Inactive state.

In some of the present implementations, the UE may additionally send a mobility history (e.g., a list that includes the UE's location history) that may indicate the camped cells (e.g., with their IDs) within a certain period of time. Determining whether the UE has stayed at the same place (or within the same area), or kept stationary may depend on the NW's instruction(s), or on the UE's implementation. In some aspects of the present implementations, the UE may send an indicator to show to the serving cell that the DC mode, or the CA mode, may be resumed (even without sending a mobility history list to the serving cell). In some of the present implementations, the UE may send information related to the target Primary Cell (PCell) and/or the target Primary Secondary Cell (PSCell) for a DC mode resume in an RRC message. Similarly, in some of the present implementations, the UE may send information related to the target PCell and the associated secondary cell(s) for a CA mode resume in an RRC message.

In some of the present implementations, a UE may provide the available early measurement results autonomously (e.g., without receiving any instruction from the NW), or based on a request (or a command) from the serving base station. In some of the present implementations, the UE may determine which available measurement results to report, and/or which available measurement results are valid, autonomously, or based on a command received from the NW (e.g., the serving base station).

Figure 2:
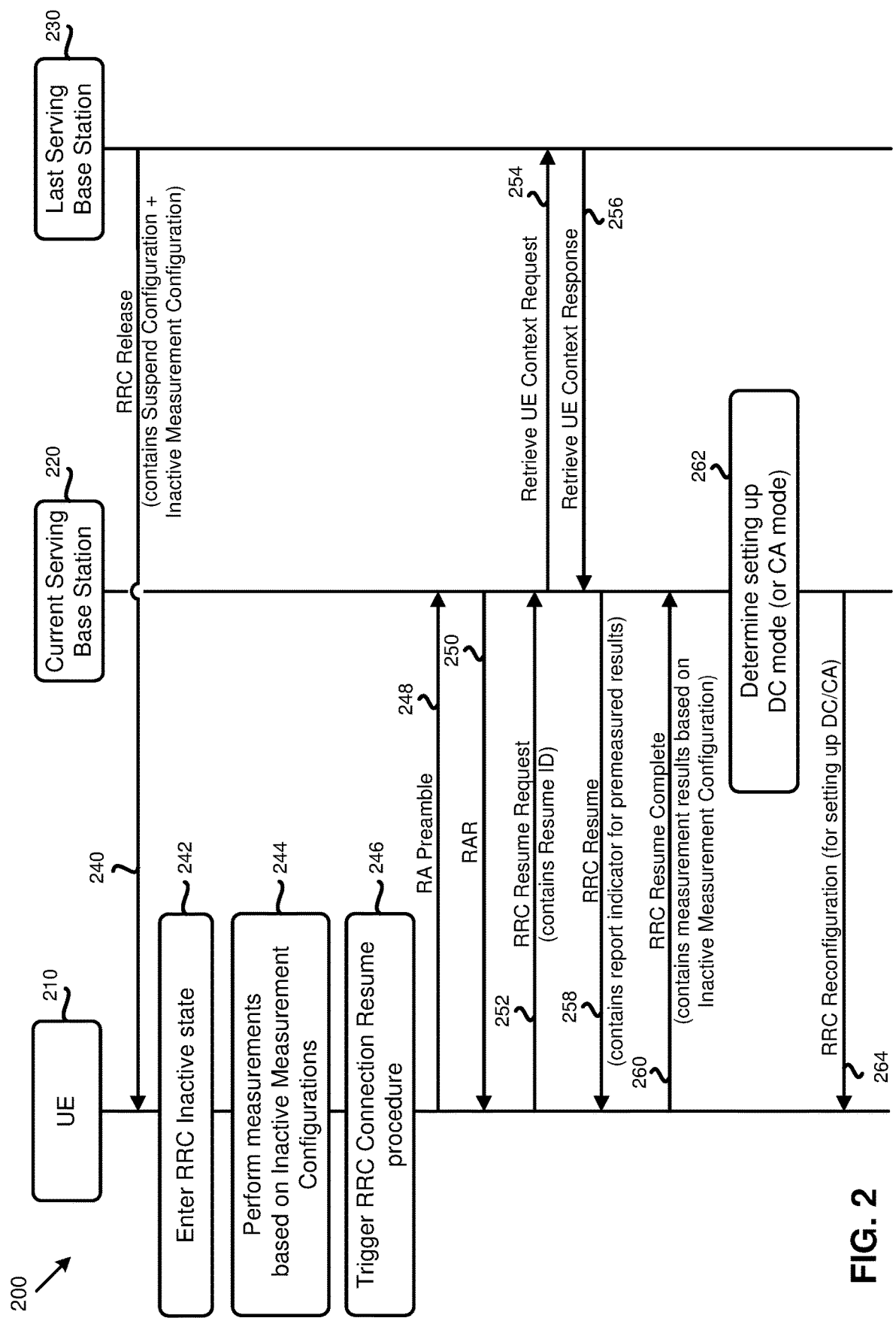
FIG. 2 is a diagram illustrating an example implementation for performing early measurements by a UE and providing early measurement results to a serving cell, according to an example implementation of the present application.

FIG. 2 is a diagram 200 illustrating an example implementation for performing early measurements by a UE and providing early measurement results to a serving cell, according to an example implementation of the present application. As shown in FIG. 2, the diagram 200 may include a UE 210, a current serving base station 220, and a last serving base station 230 (among other network entities) that may exchange data (e.g., messages, signaling, etc.) with each other, and with other network entities, at different points of time. It should be noted that, although shown as two different base stations, the current serving base station 220 and the last serving base station 230 may be the same base station.

As described above, in some of the present implementations, a serving based station may send an RRC Release message that may include suspend configuration to a UE to command the UE to enter into an inactive state. An inactive (or RRC Inactive) state is a state where a UE may remain in CM-CONNECTED state and move within an area (e.g., the RAN Notification Area, or the RNA) configured by the Next Generation RAN (NG-RAN) without being required to notify the NG-RAN.

In the RRC Inactive state, the last serving base station (e.g., a gNB node or an eNB node) may keep the UE context and the UE-associated NG connection with the serving Access and Mobility Management Function (AMF) and User Plane Function (UPF). The Suspend configuration in the RRC Release message may include the value of a full Inactive-Radio Network Temporary Identity (I-RNTI) or a short I-RNTI (which may be used as the resume ID for an RRC Connection Resume procedure), the RNA information, and/or other related information. For fast set up (i.e., fast DC and/or CA mode set up), the last serving base station may also deliver inactive measurement configuration for the UE to perform in the RRC Inactive state, or upon initializing the RRC Connection Resume procedure (e.g., sending the RA preamble), or upon a specific time (slot/symbol) before initializing the RRC Connection Resume procedure, or based on the UE's implementation (e.g., based on the target service type or the power condition).

The inactive measurement configuration, in some of the present implementations, may be the configuration for cell level and/or beam level measurements. For example, the inactive Measurement Configuration may be set to a cell-level measurement or a cell-level measurement together with beam-level measurement. Once the RRC Connection Resume procedure is triggered, the UE may provide the available measurement results based on the received inactive measurement configuration, so that the current serving base station may set the DC mode (or the CA mode) for the UE faster.

In action 240 of FIG. 2, the last serving base station 230 may send an RRC Release message, which may include a suspend configuration to the UE 210 to command the UE to enter the RRC Inactive state. In some aspects of the present implementations, the RRC Release message may also include an inactive measurement configuration to be used by the UE for preparing cell level and/or beam level early measurement results. The inactive measurement configuration, in some of the present implementations, may indicate to the UE 210 the measurement objects and which associated measurement event(s) should be applied. For example, the last serving base station 230 may ask the UE 210 to perform early measurements where the quality of a cell (e.g., cell #1) is still above a given threshold (by using the measurement event A1, as defined in the 3GPP Technical Specification (e.g., TS 38.331)). Cell #1 may be one of the cells configured in the RNA, which may be a PCell (or an SCell in the CA case). Conversely, cell #1 may be one of the cells which may be added as a PSCell in a DC case.

Other measurement events defined in the 3GPP, such as A2, A3, A4, A5, and A6, defined in the 3GPP TS 38.331, may be used for the inactive measurement configuration in some of the present implementations. It should be noted that other new measurement events are not precluded from this description. The inactive measurement configuration may be configured to use different layer 3 filtering period (e.g., shorter) compared to the one used for a normal measurement configuration (used in a connected mode). In some of the present implementations, the inactive measurement configuration may also indicate the criteria for certain measurement objects and/or certain measurement events. For example, if a UE's mobility state is high, the UE may not need to perform the early measurements. As another example, a UE may only need to perform early measurements on certain cells if the UE detects a target cell, a cell quality of which is higher than a given threshold.

Returning to FIG. 2, in action 242, after receiving (in action 240) the RRC Release message that includes the inactive measurement configuration (and the suspend configuration), the UE 210 may enter the RRC Inactive state. In action 244 the UE 210 may perform early measurements based on the inactive measurement configuration that was received in the RRC Release message. It should be noted that, as described above, in some aspects of the present implementations, the UE 210 may receive the inactive measurement configuration via broadcasting system information instead of, or in addition to, the RRC Release message.

The UE may start performing inactive (early) measurements (based on the received measurement configuration) based on different criteria in different implementations. As described above with reference to FIG. 1, a UE may start performing the early measurements upon receiving an indicator from the base station. In some of the present implementations, the UE may determine whether to perform the early measurements itself without requiring to receive an indicator from the base station. For example, the UE may decide on whether to perform the early measurements or not based on the UE's current state, such as the power condition, mobility state, etc. In some of the present implementations, the UE may determine when to start performing the early measurements, e.g., when the UE detects or reselects a cell which may be considered as a PCell. In some aspects of the present implementations, the UE may start performing the inactive (early) measurements when the RRC Connection Resume is triggered.

In action 246, the UE 210 may trigger an RRC Connection Resume procedure (e.g., when an UL or DL data transmission is required). The UE 210 may transmit, in action 248, a Random Access (RA) preamble on a selected RA resource to the current serving base station 220 in order to start a connection with the serving base station 220. In action 250, the UE 210 may receive an RA response (RAR) corresponding to the RA preamble from the current serving base station 220. In action 252, the UE 210 may send an RRC Resume Request message carrying the Resume ID (which is derived from the stored full I-NRTI or stored short I-RNTI based on the NW configurations) to the base station 220.

In one aspect of the present implementations, the RRC Resume Request message sent in action 252 may carry an indicator for early measurement results availability. In some such implementations, if the indicator for early measurement results availability is present or set to "TRUE" (or "1"), it means that the UE as received the inactive measurement configuration and has prepared early measurement results based on the inactive measurement configuration. In some other aspects of the present implementations, such as the one illustrated in FIG. 2, the RRC Resume Request message sent in action 252 does not carry any indicator for measurement results availability. That is, an indicator for early measurement results availability is not required to be included in the RRC Resume Request message in some of the present implementations, even when the UE is configured with the inactive measurement configuration and has prepared measurement results (that are currently available). In some of the present implementations, the current serving base station 220 may always assume that the UE 210 has certain available measurement results prepared based on the inactive measurement configuration sent to the UE 210. In one aspect of the present implementations, as described below with reference to FIG. 4, the indicator for early measurement results availability may be carried by a particular RRC message (e.g., by RRC Resume Complete message).

If the UE 210 accesses a serving base station (e.g., the current serving base station 220) other than the last serving base station (e.g., the last serving base station 230), the current serving base station 220 may trigger an XnAP Retrieve UE Context procedure to retrieve the UE 210's context from the last serving base station 230 and may also trigger a Data Forwarding procedure including tunnel information for potential recovery of the data from the last serving base station 230. As such, in action 254, the current serving base station 220 may send a request to the last serving base station 230 to provide UE Context (e.g., if the current serving base station 220 is able to resolve the base station identity contained in the Resume ID). In action 256, the last serving base station 230 may provide the current serving base station 220 with the UE context (e.g., if the last serving base station has the valid UE context.).

After receiving the RRC Resume Request message from the UE 210 in action 252, the current serving base station 220 may command the UE 210 to transition from the RRC Inactive state to the RRC Connected state. In order to move the UE from the RRC Inactive state to the connected state, the current serving base station 220 may send, in action 258, an RRC Resume message to the UE 210. In some of the present implementations, the RRC Resume message send to the UE 210 may carry an indicator (e.g., a report indication) for (requesting) pre-measured (or early measurement) results.

In action 260, after receiving the RRC Resume message from the current serving base station 220, the UE 210 may apply the configurations received via the RRC Resume message and send an RRC Resume Complete message back to the current serving base station 220. If the report indication for pre-measured results is present, or set to "TRUE" in the received RRC Resume message, the UE 210 may also include the available measurement results (based on the inactive measurement configuration) in the RRC Resume Complete message in some of the present implementations. In some other implementations, the UE 210 may include the available (and/or valid) measurement results in a different RRC message other than the RRC Resume Complete message. The available measurement results, in some of the present implementations, may include cell-level measurement results and/or beam-level measurement results. For example, the UE 210 may report the cell-level measurement results for a particular cell together with the best beam(s) data (e.g., identification and quality data for the beam(s) with the strongest quality) associated with the particular cell to the current serving base station 220. How to report the measurement results, e.g., number of the beams to report, the measurement quantity to be reported, etc., may be based on the received inactive measurement configuration, based on the predefined rules, based on the broadcasting system information (e.g., transmitted via System Information Block), and/or based on the UE's implementation.

After receiving the available measurement results in the RRC Resume Complete message, in action 262, the current serving base station 220 may determine whether to set the DC mode or the CA mode for the UE accordingly. In some of the present implementations, the current serving base station 220 may perform a path switch procedure to the AMF, and may trigger the release of the UE resources at the last serving base station 230. In action 264, if the current serving base station 220 determines that the UE 210 should be set up with DC (or AC), the current serving base station 220 may send an RRC Reconfiguration to set the DC mode or CA mode for the UE 210. In some of the present implementations, the last serving base station 230 may not include the inactive measurement configuration in the RRC Release message (in action 240). In some such implementations, it is up to the UE 210's implementation whether to set the indicator for pre-measured results availability. For example, the UE 210 may have some measurement results prepared based on performing early measurements in the RRC Inactive state, and may provide this measurement results to the serving base station 220 for reference.

As discussed above, in some of the present implementations, no indicator for pre-measured results availability may be included in (or carried by) an RRC Resume Request message (e.g., in action 252 of FIG. 2). Additionally, in some of the present implementations, no report indicator for pre-measured result availability may be included in (or carried by) the RRC Resume message (e.g., in action 258 of FIG. 2). The UE 210 may simply carry available measurement results based on inactive measurement configuration in the RRC Resume Complete message (e.g., in action 260 of FIG. 2) in some aspects of the present implementations. In some of the present implementations, the UE 210 may include the measurement results automatically (e.g., based on its implementation) if the UE's received uplink grant is not enough to accommodate all of the available measurement results. In some other aspects of the present implementations, the UE 210 may include the measurement results based on a set of defined rules if the received uplink grant is not enough to accommodate all of the available measurement results. For example, the set of defined rules may include a rule that specifies the latest measurement results that have a higher priority to be included. As another example, the defined rules may include a rule that specifies the measurement results related to the target cell (for transmitting the resume request message to ask for connection) may have a higher priority to be included.

In some aspects of the present implementations, if some available measurement results are not transmitted in the first received uplink grants, the UE may send the available measurement results in another RRC signaling autonomously, or based on the NW request. In some of the present implementations, if the UE receives an uplink grant that is less than X bytes (X being a real number greater than or equal to 1 that may be configurable or a fixed value), the UE may consider that the measurement results are not required to be included in the RRC Resume Complete message. In some of the present implementations, if the UE receives an uplink grant that is less than or equal to Y bytes (Y being a real number greater than or equal to 1 that may be configurable or a fixed value), the UE may consider that the measurement results are not required to be included in the RRC Resume Complete message.

Figure 3:
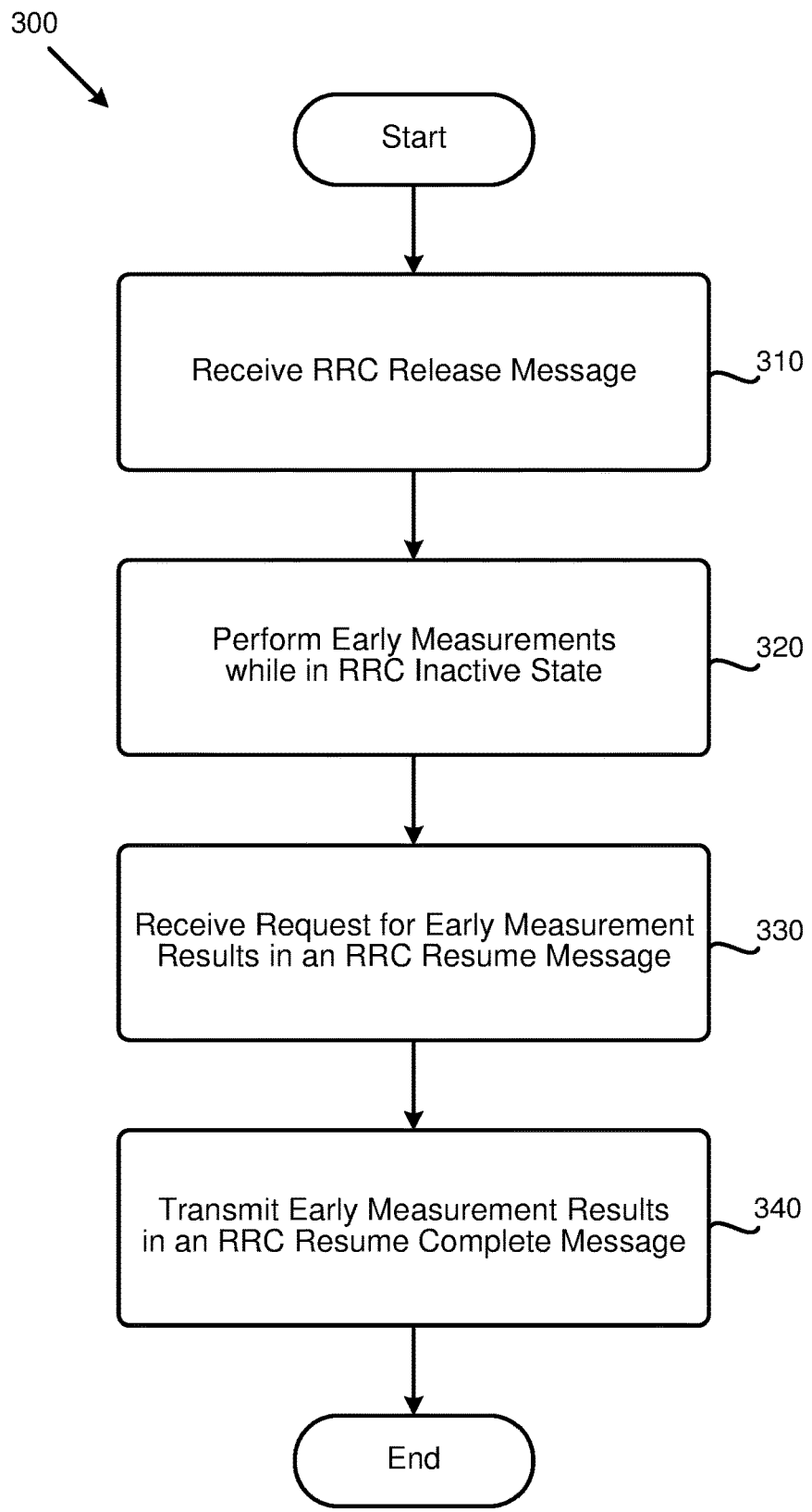
FIG. 3 is a flowchart illustrating a method (or process) performed by a UE to prepare early measurement results while the UE is in an RRC Inactive state and to transmit the results to a serving base station upon request, according to an example implementation of the present application.

FIG. 3 is a flowchart illustrating a method (or process) 300 performed by a UE to prepare early measurement results while the UE is in the RRC Inactive state and to transmit the results to a serving base station upon request, according to an example implementation of the present application. The process 300, in some of the present implementations, may start in action 310 by receiving an RRC Release message from a serving base station. The base station may send the RRC Release message to instruct the UE to enter into an inactive state. As described above, the RRC Release message may further include early measurement configurations (or inactive measurement configurations), based on which the UE may preform early measurements, while the UE is in the RRC Inactive state.

In action 320, the UE may start performing early measurements while the UE is in the RRC Inactive state. That is, after receiving the RRC Release message, the UE may transition to the inactive state, and while in the inactive state, perform one or more measurement procedures (e.g., at certain time intervals, upon receiving an indicator from the base station, based on the UE's configuration, etc.). In some of the present implementations, the inactive UE may perform one or more measurement procedures based on the configuration that was previously received from the network (e.g., via the RRC Release message, through broadcasting system information, etc.) and stored at the UE (e.g., at a local storage of the UE).

In action 330, the UE may receive a request (e.g., from the serving base station) for early measurement results. In some aspects of the present implementations, the request may be received through an RRC Resume message. That is, after the UE determines to transition back to a connected state (e.g., from the RRC Inactive state), the UE may send an RRC Resume request message to the base station. Thereafter, the base station may send a request for early measurement results when the base station responds to the RRC Resume request message of the UE (e.g., by sending an RRC Resume message that carries the request for early measurement results). In some other aspects of the present implementations, the request for early measurement results may be received through an RRC message other than the RRC Resume message. For example, in one aspect of the present implementations, the base station may send the request for early measurement results in a separate dedicated signaling (e.g., an RRC message) after the UE enters the RRC Connected state (i.e., after the UE sends the RRC Resume Complete message to the base station). In yet some other implementations, the UE may receive the request for early measurement results through broadcasting system information.

In action 340, the UE may transmit the measurement results (to the serving base station) after receiving the early measurement results request from the base station. In some aspects of the present implementations, the UE may transmit the available measurement results in an RRC Resume Complete message after receiving an RRC Resume message. In some other aspects of the present implementations, the available measurement results may be sent through a (dedicated signaling) message other than the RRC Resume Complete message. The available measurement results, as described above, may be prepared based on the inactive measurement configuration and/or the report configuration (e.g., in the RRC Reconfiguration Resume message).

The available measurement results, in some of the present implementations, may include cell-level measurements and/or beam-level measurements. For example, the UE may report the cell-level measurement results of a particular cell, together with the best beams (e.g., the beams with the strongest quality) of the particular cell. In some of the present implementations, the report configuration sent to the UE may indicate to the UE to only report the measurement results of some specific cells. For example, the current serving base station of the UE may need to know only about the measurement results of the cells that are controlled by the serving base station. In some aspects of the present implementations, the report configuration may indicate to the UE to report the measurement results of some specific cells that could be candidate PSCell in the DC mode. In some of the present implementations, the content of the measurement results (e.g., the number of beams, the measurement quantity, etc.) may be based on the received inactive measurement configuration, based on the report configuration, based on a set of predefined rules, based on the broadcasting information (e.g., transmitted via System Information Block), or based on the UE's implementation. After reporting the measurement results to the base station, the process 300 may end.

Figure 4:
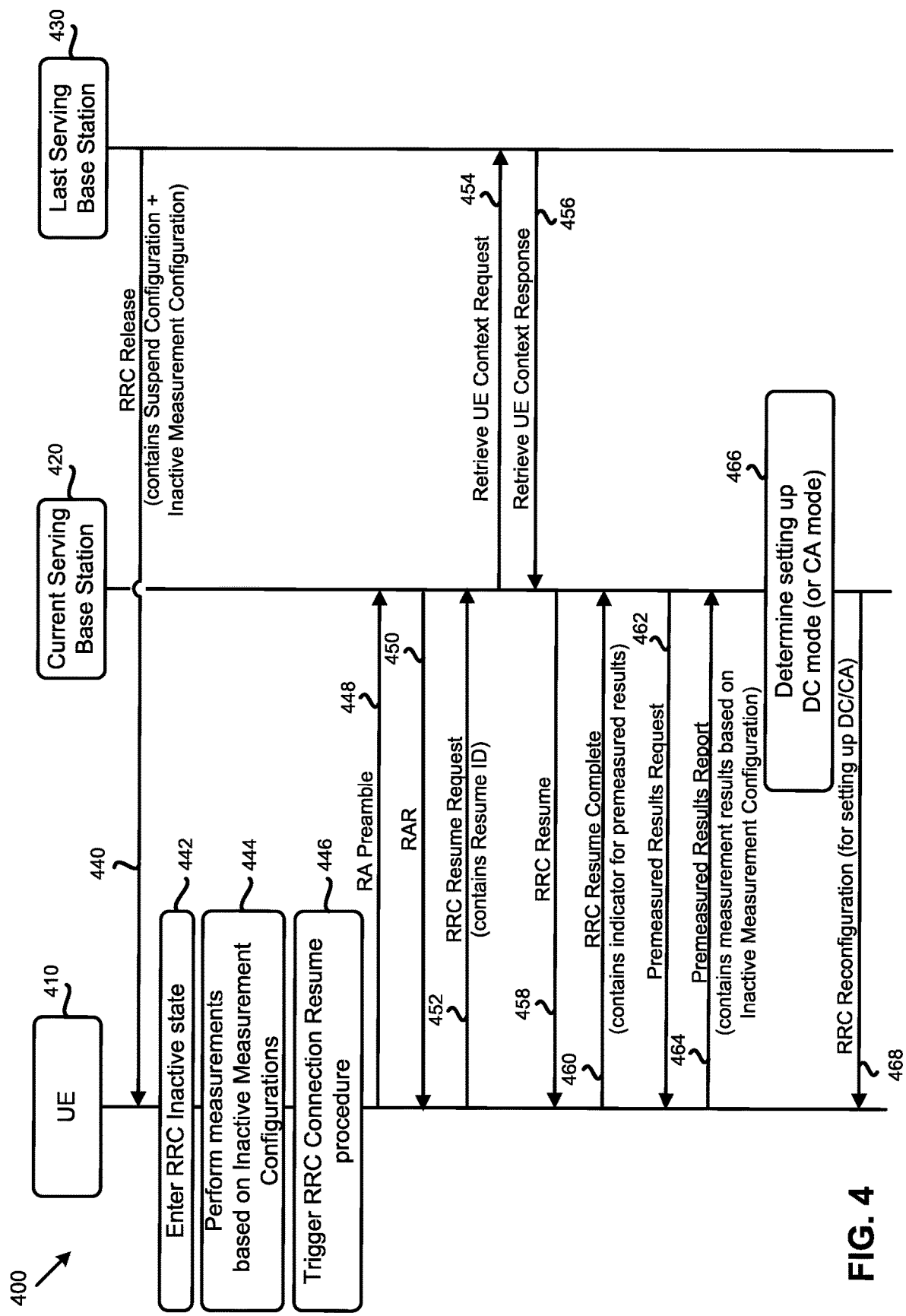
FIG. 4 is a diagram illustrating an example implementation for preparing and transmitting the early measurement results, according to an example implementation of the present application.

FIG. 4 is a diagram 400 illustrating an example implementation for preparing and transmitting the early measurement results, according to an example implementation of the present application. As shown in FIG. 4, the diagram 400 may include a UE 410, a current serving base station 420, and a last serving base station 430 (among other network entities) that communicate with each other, and with other network entities, at different points of time. It should be noted that, although shown as two different base stations, the current serving base station 420 and the last serving base station 430 may be the same base station. Actions 440-450, 454, and 456, shown in FIG. 4 are similar, respectively, to actions 240-250, 254, and 256 of FIG. 2, as described above.

As illustrated in FIG. 4, however, an indicator for the availability of the premeasured (or early measurement) results is carried in an RRC Resume Complete message. In some of the present implementations, when the current serving base station receives the indicator of premeasured results being available, the current serving base station may send a premeasured results request message to the UE. Upon receiving the premeasured results request message, in some of the present implementations, the UE may send a premeasured results report message back to the serving base station. The premeasured results may include the available measurement results that are prepared based on the inactive measurement configuration the UE has received from the last serving base station or received in the broadcasting system information.

In some of the present implementations, the UE 410 may send, in action 452, an RRC Resume Request message which may carry the Resume ID (e.g., derived from the stored I-RNTI). As shown in the figure, the RRC Resume Request message does not carry any indicator for availability of the early measurement results yet. In action 458, the current serving base station 420 may move the UE 410 from the RRC Inactive state to the RRC Connected state in an RRC Connection Resume procedure. In order to move the UE 410 from inactive state to Connected state, the current serving base station 420 may send (in action 458) an RRC Resume message to the UE 410.

In action 460, upon receiving the RRC Resume message, the UE 410 may apply the configurations in the message and send back an RRC Resume Complete message to the current serving base station 420. The RRC Resume Complete message, in some of the present implementations, may carrier an indicator for availability of the premeasured results. If the indicator of premeasured results availability is present (or set to "TRUE"), it means that the UE 410 has received the inactive measurement configurations, and prepared available measurement results based on the inactive measurement configurations. In some of the present implementations, the indicator for the premeasured results availability may not be required to be included in the RRC Resume Complete message, even when the UE is configured with the inactive measurement configurations, and even when the UE has prepared the available measurement results. The current serving base station 420 may always assume that the UE 410 has the available measurement results based on the inactive measurement configurations.

In action 462, the current serving base station 420 may send a Premeasured Results Request message to the UE 410. In some of the present implementations, the Premeasured Results Request message may be a one-bit message for indicating that the UE has to report all the available measurement results based on the inactive measurement configurations, or to report the available measurement results, as much as possible. In some of the present implementations, the UE 410 may include the measurement results based on a decision on whether the received uplink grant is, or is not, enough to accommodate all of the available measurement results. In some of the present implementations, the UE 410 may include the measurement results based on a set of (pre)defined rules if the received uplink grant is not enough to accommodate all of the available measurement results. For example, the (pre)defined rules may include a rule that specifies the latest measurement results may have a higher priority to be included. As another example, the set of rules may include a rule that the measurement results related to the target cell (for transmitting the resume request message to ask for a connection) may have a higher priority to be included. In some of the present implementations, if some available measurement results are not transmitted in the first received uplink grant, the UE 410 may send the available measurement results in another RRC signaling (e.g., automatically, or based on a NW request).

Upon receiving the Premeasured Results Request message, in action 464, the UE may send a Premeasured Results Report message which may include the available measurement results based on the inactive measurement configurations. As discussed above, in some of the present implementations, the available measurement results may include cell-level measurements and/or beam-level measurement. For example, the UE may report the cell-level measurement results of a cell together with the best beams (e.g., the beams with the strongest quality) of the cell. The content in the measurement results (e.g., the number of beams, the measurement quantity, etc.) may be based on the received inactive measurement configuration, the predefined rules, the broadcasting information (e.g., transmitted via System Information Block), or based on the UE's implementation.

In action 466, after receiving the available measurement results based on the inactive measurement configuration in the Premeasured Results Report message, the current serving base station 420 may decide whether to set the DC mode or CA mode for the UE 410, based on the received results. It should be noted that the current serving base station 420 may perform s path switch procedure (e.g., to an AMF) and may trigger the release of the UE resources at the last serving base station 430.

In action 468, the current serving base station 420 may send an RRC Reconfiguration message to the UE 410 to set the DC mode or CA mode for the UE 410. In some of the present implementations, the UE may include an indicator for the availability of the premeasured results in another RRC message (e.g., other than the RRC Resume Complete message) when there is any available measurement result(s) based on the inactive measurement configurations.

In some of the implementations, it may depend on the UE 410's implementation whether to set the indicator of premeasured results availability or not. For example, in one aspect of the present implementations, the UE 410 may have some measurement results that are prepared while in the RRC Inactive state, and may provide those results to the current serving base station 420, without sending the availability indicator beforehand. That is, in some of the present implementations, there might be no indicator of premeasured results availability in the RRC Resume Complete message sent by the UE, nor any premeasured results request message from the base station. The UE, in some aspects of the present implementations, may send the premeasured results report message to the base station when there is any available measurement results based on the inactive measurement configurations.

In some of the present implementations, the UE may include the measurement results based on the UE's decision (e.g., when the received uplink grant is not enough to accommodate all the available measurement results). In some of the present implementations, the UE may include the measurement results based on the defined rules (e.g., if the received uplink grant is not enough for all of the available measurement results). For example, the defined rules may be that the latest measurement results may have a higher priority to be included, or the defined rules may be that the measurement results related to the target cell (for transmitting the resume request to ask for connecting) may have a higher priority to be included. In some of the present implementations, if some available measurement results are not transmitted in the first received uplink grant, the UE may send the available measurement results in another dedicated signaling automatically (or based on a NW request).

In some of the present implementations, if the UE receives an uplink grant which is less than X bytes (X being a number equal to or greater than 1), the UE may consider that no measurement result is required (to include in a premeasured results report message). The number X may be configurable (e.g., by the NW) or a fixed value. In some of the present implementations, if the UE receives an uplink grant which is less than or equal to Y bytes (Y being a number equal to or greater than 0), the UE may consider that no measurement result is required to be included in the premeasured results report message. Y may be configurable number, or a fixed value.

Figure 5:
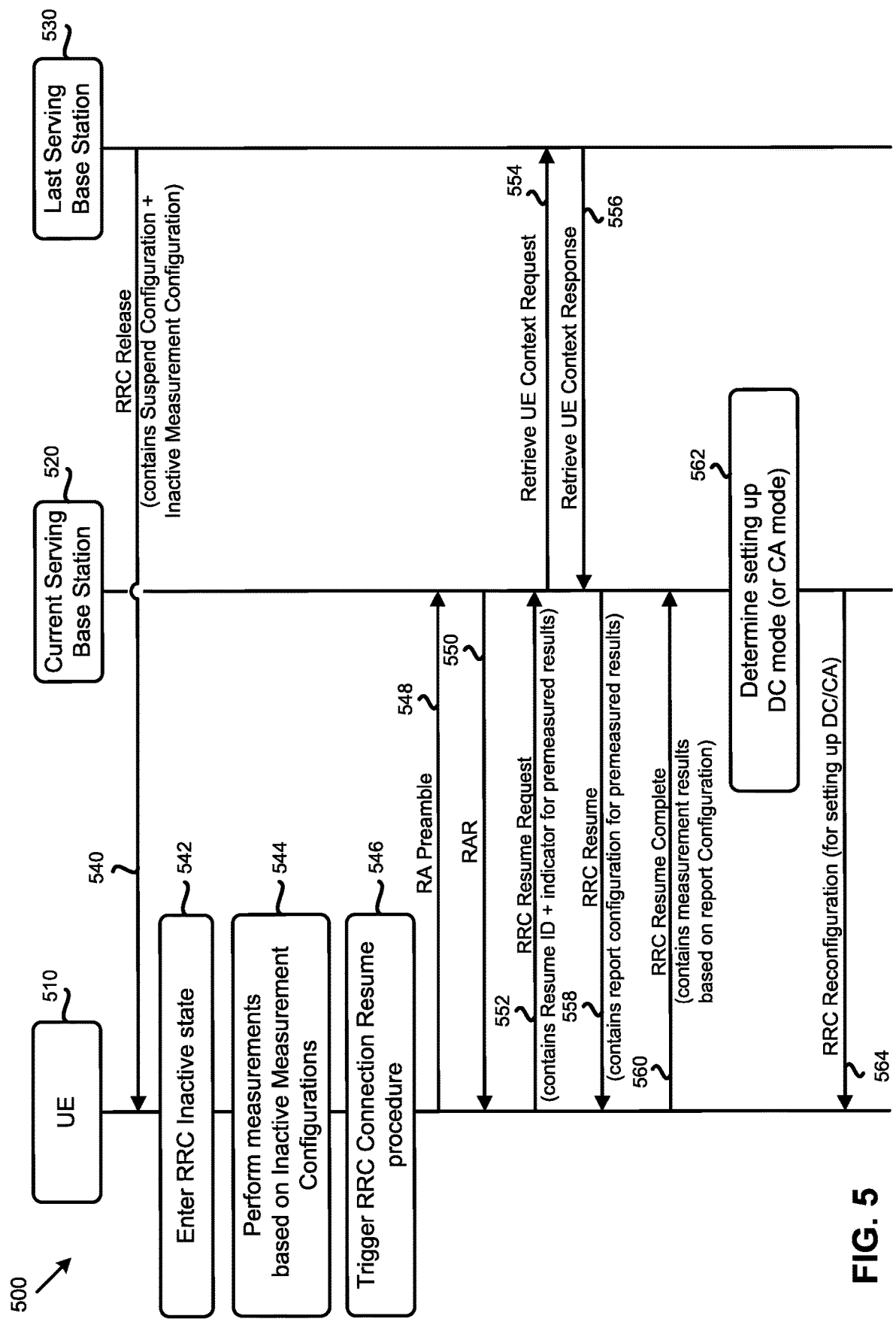
FIG. 5 is a diagram illustrating an example implementation for preparing and transmitting the early measurement results, according to an example implementation of the present application.

FIG. 5 is a diagram 500 illustrating an example implementation for preparing and transmitting the early measurement results, according to an example implementation of the present application. As shown in FIG. 5, the diagram 500 may include a UE 510, a current serving base station 520, and a last serving base station 530 (among other network entities) that communicate with each other, and with other network entities, at different points of time. It should be noted that, although shown as two different base stations, the current serving base station 520 and the last serving base station 530 may be the same base station. Actions 540-550, 554, 556, 562, and 564, shown in FIG. 5 are similar, respectively, to actions 240-250, 254, 256, 262, and 264 of FIG. 2, as described above.

As illustrated in FIG. 5, the differences with FIG. 2 though, are in actions 552, 558, and 560. That is, unlike the action 252 shown in FIG. 2, in action 552, the RRC Resume Request message sent by the UE 510 to the base station 520 may carry an indicator for indicating to the base station 520 that premeasured results are available for transmission to the base station 520. Additionally, the current serving base station 520 may send an RRC Resume message, in action 558, that may carry a report configuration for the premeasured results in some of the present implementations. Through such a report configuration for premeasured results, the current serving base station 520 may indicate to the UE 510 which premeasured results are required to report. Therefore, not all of the available measurement results (prepared based on the inactive measurement configurations) are required to be reported to the base station 520. Upon receiving the RRC Resume message that includes the report configuration for premeasured results, the UE 510 may include the specifically requested available measurement results in the RRC Resume Complete message and transmit, in action 560, the RRC Resume Complete message. To the base station 520.

More specifically, after receiving the RRC Resume Request message from the UE 510 in action 552, the current serving base station 520 may move the UE 510 from the RRC Inactive state to the RRC Connected state in action 558. To move the UE 510 from the RRC Inactive state to the connected state, the current serving base station 520 may send an RRC Resume message to the UE 510, which may carry a report configuration for premeasured results. In action 560, after receiving the RRC Resume message, the UE 510 may apply the configurations in the message to one or more measurement procedures and send back an RRC Resume Complete message to the current serving base station 520. If the report configuration for premeasured results is present in the received RRC Resume message, the UE 510 may include the available measurement results (requested by the base station 520) based on the inactive measurement configuration, and/or the report configuration in the RRC Reconfiguration Resume message.

As described above, the available measurement results may include cell-level measurements and/or beam-level measurements. For example, the UE may report the cell-level measurement results for a particular cell with, or without, the results for one or more beams (e.g., the beam(s) with the strongest quality) of the particular cell. In some of the present implementations, the report configuration may indicate to the UE to only report the measurement results for some specific cells. For example, the current serving base station may only need the measurement results for the cells that are controlled by the serving base station. In some of the present implementations, the report configuration may indicate to the UE to report the measurement results of some specific cells that are candidate PSCells for a DC mode.

In some of the present implementations, the UE may include the measurement results based on whether the received uplink grant is not enough to accommodate all of the available measurement results. In some of the present implementations, the UE may include the measurement results based on the defined rules if the received uplink grant is not enough to accommodate all the available measurement results. For example, the defined rules may be that the latest measurement results may have a higher priority to be included or that the measurement results related to the target cell (for transmitting the resume request to ask for connecting) may have a higher priority to be included. In some of the present implementation, if some available measurement results are not transmitted in the first received uplink grant, the UE may send the available measurement results in another RRC signaling (automatically or based on a NW request).

As described above, in some of the present implementations, unlike the action 552 of FIG. 5, no indicator for premeasured results availability may be included in the RRC Resume Request message. In some of the present implementations, there may be no report configuration for premeasured results either (such as the one shown in action 558 of FIG. 5). In some aspects of the present implementations, the UE may carry the available measurement results, based on inactive measurement configurations, in an RRC Resume Complete message without sending any indicator to the base station (e.g., via an RRC Resume Request message), or receiving any configuration report from the base station (e.g., via an RRC Resume message). In some of the present implementations, the UE may include the measurement results based on whether the received uplink grant is not enough to accommodate all of the available measurement results In some aspects of the present implementations, the inactive measurement configurations may be commonly applied to all members (e.g., UEs) within a particular area (e.g., a cell, an RNA, etc.). In some of the present implementations, the inactive measurement configurations may be signaled via a specific System Information Block (SIB). In some of the present implementations, if the UE doesn't receive the inactive measurement configurations during the suspend procedures, the UE may try to receive the SIB to acquire the inactive measurement configurations and to identify its validity. Afterwards, the UE may perform the inactive measurements while moving within the same area. In some aspects of the present implementations, the value tag and area ID (w.r.t. an SI) may be used to facilitate the validity check of the inactive measurement configurations. For example, the cell members in the RNA may use the same area ID for the related measurement system information signaling.

In Implementation some of the present implementations, the current serving base station may send, in an RRC Resume message, a Premeasured Results Request message including a report configuration for premeasured results to the UE. Upon receiving the RRC Resume message, the UE may apply the configurations in the message and send back an RRC Resume Complete message to the current base station. If the report configuration for premeasured results is present in the received RRC Resume message, the UE may include the available measurement results based on the inactive measurement configurations and/or the report configuration in the RRC Resume Complete message. In some of the present implementations, the report configuration may indicate to the UE to only report the measurement results of some specific cells. For example, the current serving base station may only need the measurement results of the cells that are controlled by the serving base station only. In some of the present implementations, the report configuration may indicate to the UE to report the measurement results of some specific cells that are candidate PSCells for a DC mode. In some of the present implementations, the UE may include an indicator for the available premeasured results in another RRC message (e.g., when there is any measurement result(s) available based on the inactive measurement configuration).

In some of the present implementations, there may be no indicator for premeasured results availability in the RRC Resume Complete message, and there may be no premeasured results request message. The UE may simply send the premeasured results report message when there is any available measurement result prepared based on the inactive measurement configurations. In some of the present implementations, the UE may include the measurement results based on whether the received uplink grant is not enough to accommodate all of the available measurement results. In some of the present implementations, the UE may include the measurement results based on the defined rules if the received uplink grant is not enough to all the available measurement results. For example, the defined rules may be that the latest measurement results may have a higher priority or that the measurement results related to the target cell (for transmitting the resume request to ask for connecting) may have a higher priority to be included.

In some of the present implementations, if some available measurement results are not transmitted in the first received uplink grants, the UE may send the available measurement results in another RRC signaling. In some of the present implementations, if the UE receives an uplink grant which is less than X bytes, the UE may consider that the measurement result is not required to be included in the premeasured results report message (where X is configurable, or a fixed value, equal to or greater than 1). In some aspects of the present implementations, if the UE receives an uplink grant which is less than or equal to Y bytes, the UE may consider that the measurement result is not required to be included in the premeasured results report message (where Y is a configurable, or a fixed value, greater than 0).

In some of the present implementations, the UE may only inform the current serving base station to resume (or not resume) the stored DC configuration, or CA configuration, without reporting any early measurement results to the base station, or in addition to reporting the early measurement results to the base station. That is, the UE may include one or more indicators (e.g., in dedicated signaling) that may indicate to the current serving base station to resume a previous DC mode, or a previous CA mode.

Figure 6:
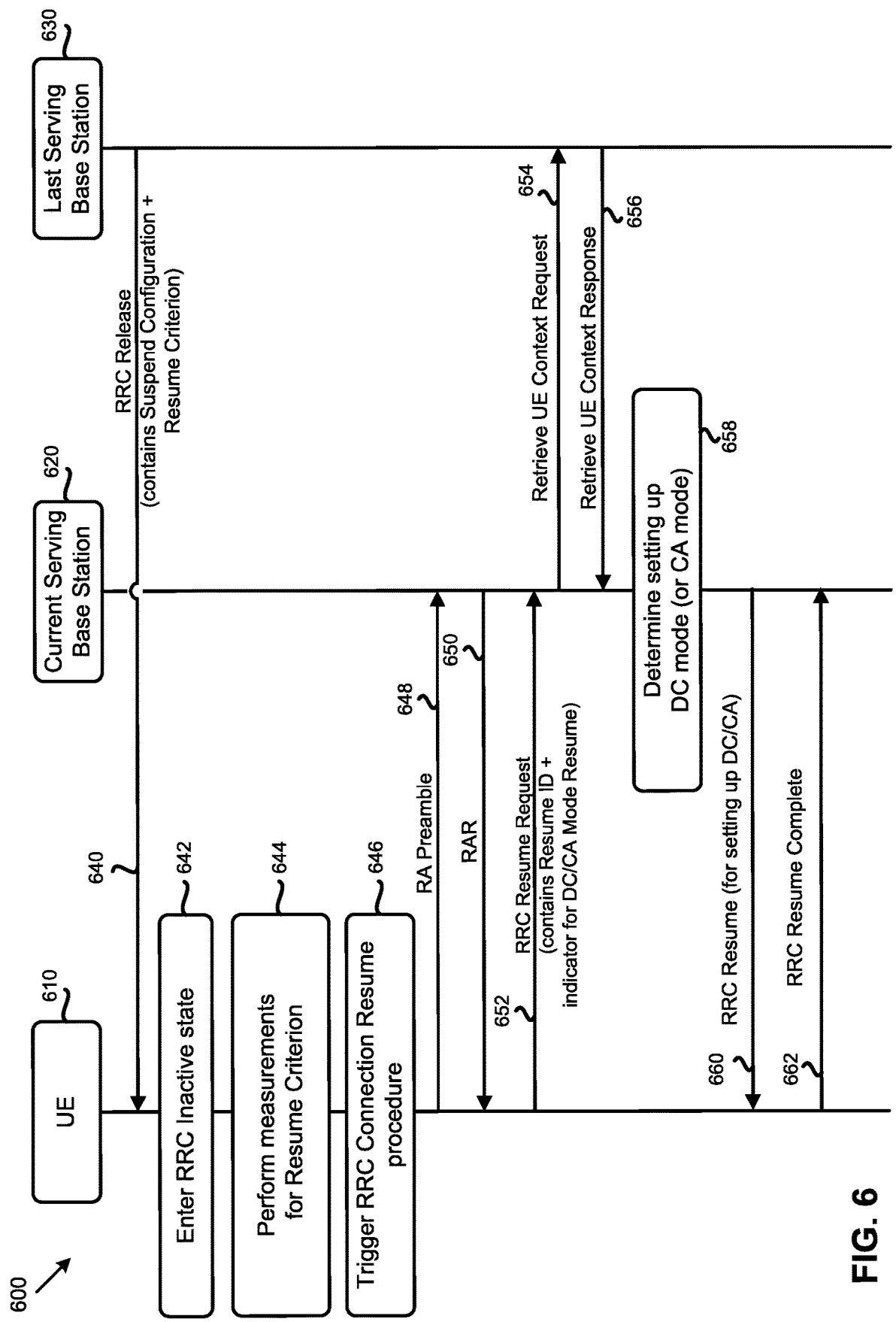
FIG. 6 is a diagram illustrating an example implementation for setting up a dual connectivity (DC)/carrier aggregation (CA) mode for a UE, according to an example implementation of the present application.

FIG. 6 is a diagram 600 illustrating an example implementation for setting up a dual connectivity (DC)/carrier aggregation (CA) mode for a UE, according to an example implementation of the present application. As shown in FIG. 6, the diagram 600 may include a UE 610, a current serving base station 620, and a last serving base station 630 (among other network entities) that communicate with each other, and with other network entities, at different points of time. It should be noted that, although shown as two different base stations, the current serving base station 620 and the last serving base station 630 may be the same base station. Actions 642, 646-650, 654, and 656, shown in FIG. 6 are similar, respectively, to actions 242, 246-250, 254, and 256 of FIG. 2, as described above.

As illustrated in FIG. 6, in action 640, the last serving base station 630 may send an RRC Release message including a Suspend Configuration along with Resume Criterion (or Criteria) for fast set up DC mode and/or CA mode to the UE 610. In some of the present implementations, the Resume Criterion may indicate the criterion for resuming the stored DC configuration and/or CA configuration. As an example, if Cell #1 and Cell #2 are a potential PCell and a potential PSCell, respectively, of a stored DC configuration, the Resume Criterion may set the thresholds for the cell quality of Cell #1 and Cell #2. Then, if the cell quality of Cell #1 is above the defined threshold and the cell quality of Cell #2 is above the defined threshold, the UE 610 may send an indicator to inform the current serving base station 620 that the stored DC configuration may be resumed. In some of the present implementations, the Resume Criterion may also indicate the list of cells to be monitored for a DC mode and/or CA mode.

In some of the present implementations, the UE 610 may receive PCell(s) and PSCell(s) pairs (e.g., in the Resume Criterion received from the last serving base station 630) for resuming the DC mode. In some of the present implementations, the UE 610 may receive a group of cells (e.g., in the Resume Criterion received from the last serving base station 630) for a CA mode resume. In some of the present implementations, the Resume Criterion may indicate (to the current serving base station 620) how the UE 610 may consider itself as a stationary UE. In one aspect of the present implementation, such a consideration may be based on the variation of the cell quality (e.g., Reference Signal Received Power (RSRP), Reference Signal Received Quality (RSRQ), etc.) of the cell to which the UE is connected before entering an inactive state. If the UE determines that the UE is stationary, the UE may set one or more indicators associated with the DC mode resume, or CA mode resume, as "TRUE," or may include the indicator(s) of for the DC mode resume, or the CA mode resume, in an RRC message. In some of the present implementations, the last serving base station 630 may not include the Resume Criterion in the RRC Release message. In some such implementations, it may be up to the UE's implementation whether to set the indicator(s) for the DC mode resume or the CA mode resume.

In action 644, in some of the present implementations, the UE 610 may perform measurements based on the Resume Criterion received in action 640. In some of the present implementations, the UE 610 may determine whether to perform the measurements based on the Resume Criterion received from the last serving base station 630 or not. For example, the UE 610 may decide to perform the measurements based on the power condition of the UE, the mobility state of the UE, etc. In some of the present implementations, the UE 610 may determine when to start performing the measurement procedure(s) for the received Resume Criterion (e.g., when the UE detects a cell is leaving, the UE may start performing the measurement procedures). In some of the present implementations, the UE 610 may start performing one or more measurement procedure(s) for the received Resume Criterion when the RRC Connection Resume is triggered or may be triggered.

In action 652, the UE 610 may send an RRC Resume Request message carrying the Resume ID (which is derived from the stored I-RNTI), and the indicator(s) for the DC mode resume, or the CA mode resume, to the current serving base station 620. If the indicator for the DC mode resume is present (or set to "TRUE"), it means that the resume criterion for DC is satisfied and the stored DC configuration on the UE side may be resumed. Similarly, if the indicator for the CA mode resume is present (or set to "TRUE"), it means that the resume criterion for CA is satisfied and the stored CA configuration on the UE side may be resumed. In some of the present implementations, the UE 610 may send the related information about the target PCell and the target PSCell for the DC mode resume in other (e.g., following) RRC message(s). In some of the present implementations, the UE 610 may send the related information about the target PCell and the associated secondary cell(s) for the CA mode resume in other (e.g., following) RRC message(s). In some of the present implementations, the indicator for the DC mode resume and/or the indicator for the CA mode resume may be included in the resume cause in the RRC Resume Request message. That is, the indicator for the DC mode resume may be one of the resume causes.

Similarly, the indicator for the CA mode resume may be one of the resume causes.

In action 658, when the current serving base station 620 receives the indicator(s) for the DC mode resume or the CA mode resume in the RRC Resume Request message, the base station 620 may determine whether to set the DC mode or the CA mode for the UE in some of the present implementations. It should be noted that the current base station may perform a path switch procedure to the AMF and may trigger the release of the UE resources at the last serving base station 630.

In action 660, after receiving the RRC Resume Request message, the current serving base station 620 may move the UE 610 from the RRC Inactive state to the RRC Connected state in some of the present implementations. To move the UE 610 from the RRC Inactive state to the connected state, the current serving base station 620 may send an RRC Resume message, which may directly set the UE 610 to a DC mode or a CA mode. In action 662, after receiving the RRC Resume message, the UE 610 may apply the configurations received in the message, and may send an RRC Resume Complete message back to the current serving base station 620.

In some of the present implementations, the last serving base station 630 may not include the Resume Criterion in the RRC Release message (e.g., in action 640). In some such implementations, it may be up to the UE 610's implementation whether to set the indicator(s) for the DC mode resume and/or the CA mode resume. That is, if the UE 610 considers that the stored DC configuration may be resumed, the UE may send the indicator for the DC mode resume to the current serving base station 620 in some of the present implementations. Similarly, if the UE 610 considers that the stored CA configuration may be resumed, the UE may send the indicator for the CA mode resume to the current serving base station 620 in some of the present implementations.

Additionally, in one aspect of the present implementations, if the UE 610 determines that the stored DC configuration may be resumed, the UE 610 may send the useful (available) measurement results for the DC mode resume to the current serving base station 620 for reference. Similarly, if the UE 610 considers that the stored CA configuration may be resumed, the UE 610 may send the available measurement results for the CA mode resume to the current serving base station 620 for reference.

Figure 7:
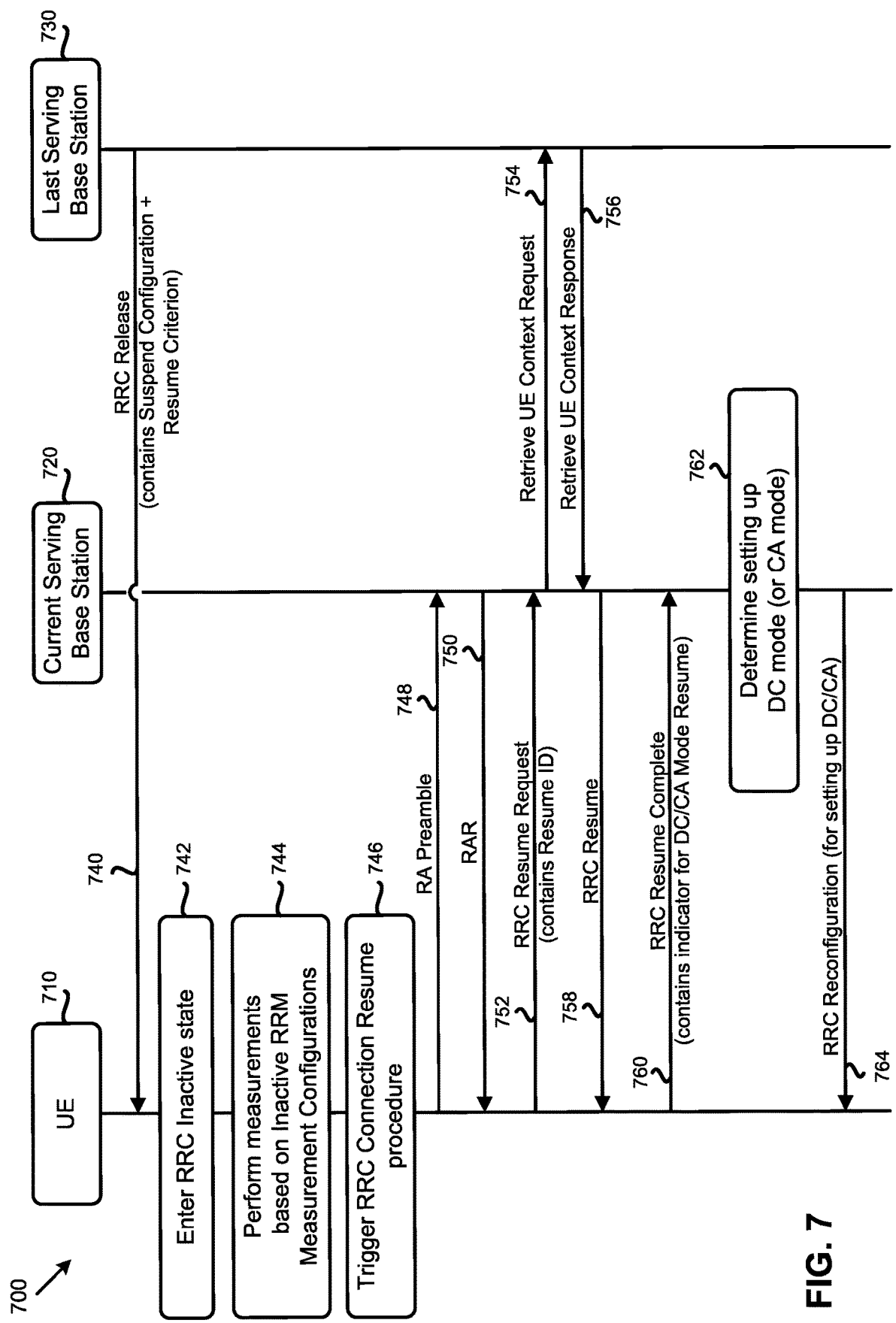
FIG. 7 is a diagram illustrating an example implementation for setting up a DC/CA mode for a UE, according to an example implementation of the present application.

FIG. 7 is a diagram 700 illustrating an example implementation for setting up a DC/CA mode for a UE, according to an example implementation of the present application. As shown in FIG. 7, the diagram 700 may include a UE 710, a current serving base station 720, and a last serving base station 730 (among other network entities) that communicate with each other, and with other network entities, at different points of time. It should be noted that, although shown as two different base stations, the current serving base station 620 and the last serving base station 630 may be the same base station. Actions 740-750, 754, and 756, shown in FIG. 7 are similar, respectively, to actions 640-650, 654, and 656 of FIG. 6, as described above.

In action 752, the UE 710 may send an RRC Resume Request message that carries the Resume ID (which is derived from the stored I-RNTI) to the current serving base station 720. After receiving the RRC Resume Request message from the UE, the current serving base station 720 may move the UE 710 from the current inactive state to the RRC Connected state. To move the UE 710 from the RRC Inactive state to the connected state, the current serving base station 720 may send, in action 758, an RRC Resume message to the UE 710.

After receiving the RRC Resume message, in action 760, the UE 710 may apply the configurations received in the message and send an RRC Resume Complete message back to the current serving base station 720. The RRC Resume Complete message that the UE 710 sends to the base station 720 may include one or more indicator(s) for the DC mode resume or the CA mode resume. If the indicator of DC mode resume is present or set to "TRUE", it means that the resume criterion for DC is satisfied and the stored DC configuration on the UE side may be resumed. Conversely, if the indicator of CA mode resume is present or set to "TRUE", it means that the resume criterion for CA is satisfied and the stored CA configuration on the UE side may be resumed.

In some of the present implementations, the UE 710 may also include the related information about the target PCell and the target PSCell for the DC mode resume in the RRC Resume Complete message or in a following RRC message. In some of the present implementations, the UE may include the related information about the target PCell and the associated secondary cell for the CA mode resume in the RRC Resume Request message or in a following RRC message.

In action 762, after receiving the indicator(s) for the DC mode resume or the CA mode resume in the RRC Resume Complete message, the current serving base station 720 may decide whether to set the DC mode or CA mode for the UE 710 accordingly. It should be noted that the current serving base station 720 may perform a path switch procedure to AMF and may trigger the release of the UE 710 resources at the last serving base station 730.

Lastly, in action 764, the current serving base station 720 may send an RRC Reconfiguration message to the UE 710 to set the DC mode or the CA mode for the UE 710. In some of the present implementations, the UE 710 may include one or more indicators for the DC mode resume or the CA mode resume in another RRC message when there is any available measurement result(s) based on the Resume Criterion. In some of the present implementations, the last serving base station 730 may not include the Resume Criterion in the RRC Release message (e.g., in action 740). In some such implementations, it may be up to the UE 710's implementation whether to set the indicator(s) for the DC mode resume or the CA mode resume.

Figure 8:
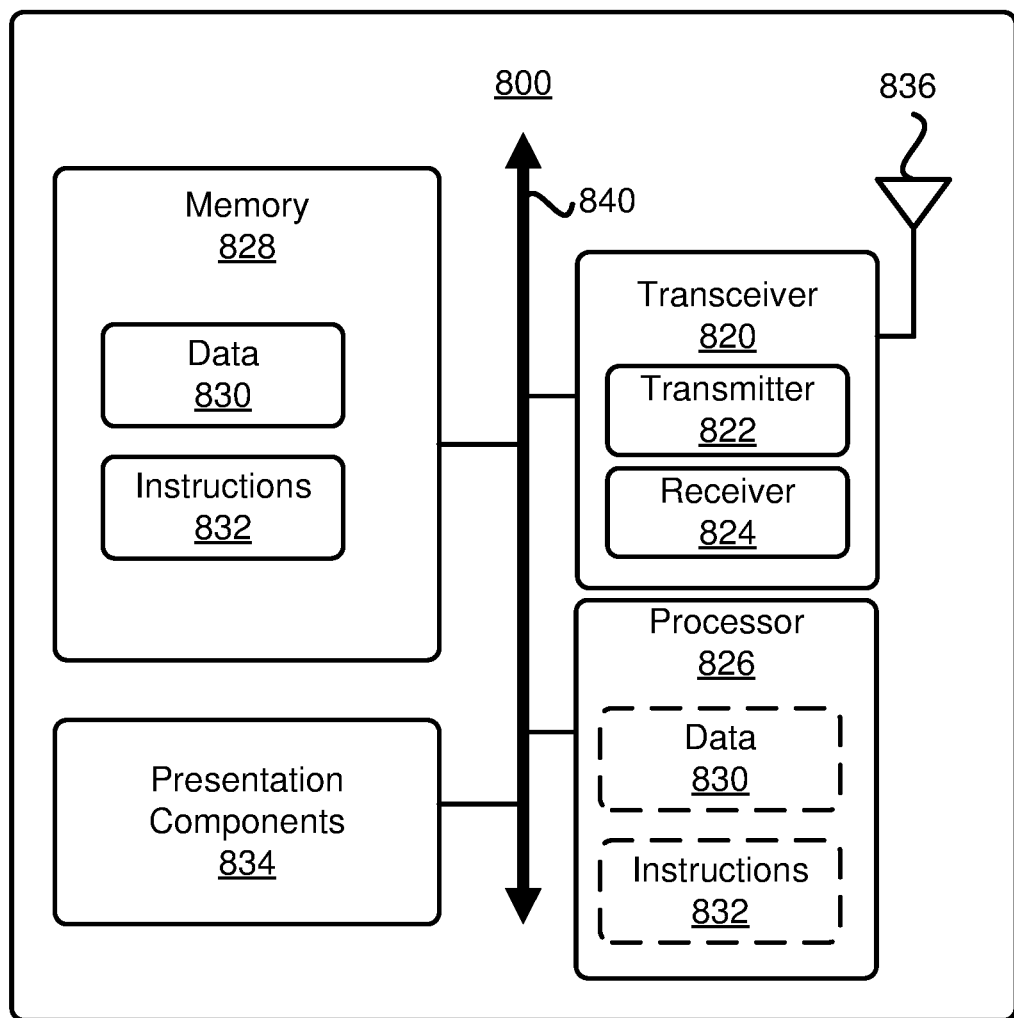
FIG. 8 illustrates a block diagram of a node for wireless communication, in accordance with various aspects of the present application.

FIG. 8 illustrates a block diagram of a node for wireless communication, in accordance with various aspects of the present application. As shown in FIG. 8, node 800 may include transceiver 820, processor 826, memory 828, one or more presentation components 834, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control signalings.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices.

Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 8. Alternatively, instructions 832 may not be directly executable by processor 826 but be configured to cause node 800 (e.g., when compiled and executed) to perform various functions described herein.

Processor 826 may include an intelligent hardware device, for example, a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. For example, one or more presentation components 834 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for reporting measurement results by a user equipment (UE), the method comprising:
    receiving, at the UE, a radio resource control (RRC) release message to transition to an RRC Inactive state;
    determining whether the RRC release message contains an inactive measurement configuration;
    performing measurements based on the inactive measurement configuration, while in the RRC Inactive state when the RRC release message contains the inactive measurement configuration;
    when the RRC release message does not contain the inactive measurement configuration, performing the measurements based on another inactive measurement configuration received via broadcasting system information;
    receiving an RRC resume message from a base station, the RRC resume message comprising a request for the measurement results; and
    transmitting results of the measurements performed during the RRC Inactive state to the base station in an RRC resume complete message.

2. The method of claim 1, wherein the inactive measurement configuration comprises at least one measurement object and measurement configuration associated with the at least one measurement object.

3. The method of claim 1, wherein the another inactive measurement configuration comprises at least one measurement object and measurement configuration associated with the at least one measurement object.

4. The method of claim 1, wherein the results of the measurements performed during the RRC Inactive state comprise beam-level measurement.

5. The method of claim 4, wherein the beam-level measurement comprises at least identification for at least a best beam that has a strongest beam quality.

6. The method of claim 5, wherein the beam-level measurement further comprises at least identification for one or more beams other than the best beam when network requires the measurement results for the one or more beams.

7. The method of claim 1, further comprising, after transmitting the results of the measurements performed during the RRC Inactive state to the base station, receiving a first RRC reconfiguration message from the base station to set up at least one of a dual connectivity (DC) mode and a carrier aggregation (CA) mode.

8. The method of claim 1, further comprising transmitting an indicator to the base station for resuming a previous dual connectivity (DC) mode irrespective of the measurement results.

9. The method of claim 1, further comprising, before performing the measurements in the RRC Inactive state, receiving the broadcasting system information comprising an indicator associated with performing the measurements in the RRC Inactive state.

10. A user equipment (UE), comprising:
    one or more non-transitory computer-readable media having computer-executable instructions for reporting measurement results measured in a radio resource control (RRC) Inactive state; and
    at least one processor coupled to the one or more non-transitory computer-readable media, and configured to execute the computer-executable instructions to:
        receive, at the UE, an RRC release message to transition to an RRC Inactive state;
        determine whether the RRC release message contains an inactive measurement configuration;
        perform measurements based on the inactive measurement configuration, while in the RRC Inactive state when the RRC release message contains the inactive measurement configuration;
        when the RRC release message does not contain the inactive measurement configuration, perform the measurements based on another inactive measurement configuration received via broadcasting system information;
        receive an RRC resume message from a base station, the RRC resume message comprising a request for the measurement results; and
        transmit results of the measurements performed during the RRC Inactive state to the base station in an RRC resume complete message.

11. The UE of claim 10, wherein the inactive measurement configuration comprises at least one measurement object and measurement configuration associated with the at least one measurement object.

12. The UE of claim 10, wherein the another inactive measurement configuration comprises at least one measurement object and measurement configuration associated with the at least one measurement object.

13. The UE of claim 10, wherein the results of the measurements performed during the RRC Inactive state comprise beam-level measurement.

14. The UE of claim 13, wherein the beam-level measurement comprises at least identification for at least a best beam that has a strongest beam quality.

15. The UE of claim 14, wherein the beam-level measurement further comprises at least identification for one or more beams other than the best beam when network requires the measurement results for the one or more beams.

16. The UE of claim 10, wherein the processor is further configured to execute the computer-executable instructions to, after transmitting the results of the measurements performed during the RRC Inactive state to the base station, receive a first RRC reconfiguration message from the base station to set up at least one of a dual connectivity (DC) mode and a carrier aggregation (CA) mode.

17. The UE of claim 10, wherein the processor is further configured to execute the computer-executable instructions to transmit an indicator to the base station for resuming a previous dual connectivity (DC) mode irrespective of the measurement results.

18. The UE of claim 10, wherein the processor is further configured to execute the computer-executable instructions to, before performing the measurements in the RRC Inactive state, receive the broadcasting system information comprising an indicator associated with performing the measurements in an RRC Inactive state.

* * * * *